Patented Jan. 7, 1930

1,742,191

UNITED STATES PATENT OFFICE

CHARLES E. ARNOLD, OF ODESSA, DELAWARE, ASSIGNOR TO ELECTRO COMPANY, OF ODESSA, DELAWARE, A CORPORATION OF DELAWARE

METHOD OF TREATING MINERALS CONTAINING POTASSIUM, ALUMINUM AND IRON

No Drawing.    Application filed February 19, 1925.    Serial No. 10,409.

My invention is a novel method of treating siliceous minerals as greensand which contain potassium, aluminum and iron in order to separately extract the potassium and aluminum contents, separating them from the iron contents.

Certain prior methods to effect this general purpose have involved the treating of the mineral with sulfuric acid to bring the metallic ingredients of the mineral into solution as sulfates, the separating of the liquid sulfates from the undissolved residue by filtration or decantation and the subsequent cooling of the solution to crystallize out potash alum. It is known, however, that crystallization is not the most efficient way to extract from a liquid all of its crystallizable constituents.

My invention involves a novel method of treating the solution of sulfates after it has been separated from the residue. The preliminary sulfatizing, dissolving and separating steps need not differ from known methods.

I have discovered that of the three named sulfates the iron and aluminum sulfates may be efficiently precipitated by concentrating the acid solution instead of crystallizing them. Sufficient excess acid for the purpose will be present in the solution if the leaching has been carried on with a considerable excess of acid, which is preferable in order to quickly and efficiently carry on the leaching and separating steps. In some cases, however, additional acid may be added to the solution for purpose of concentration.

To effect the precipitation I abstract the water from the solution or most of it and thereby concentrate the free acid present. When this occurs the iron and aluminum sulfates will precipitate out of the strong sulfuric acid in the form of a sludge. The bulk of the solution now consisting of excess acid containing the potassium sulfate is either decanted off for use in the leaching of subsequent batches of the mineral or else the sludge may be directly treated as will now be described. Considerable concentration of the acid is preferable. The potassium sulfate will remain with the sulfuric acid while hot being soluble in the same, but will precipitate out when the acid gets cold.

After the acid is cooled and the potassium sulfate precipitated the bulk of the acid is decanted off and the sludge of mixed sulfates can be handled for further treatment in accordance with my invention in its precipitated condition, but it is advantageous to add sufficient dry oxide or other suitable material to make it dryer and more compact and therefore, more easily handled. I then pass the sludge of mixed sulfates through a zone of heat that will decompose the ferric sulfate without decomposing the potassium or the aluminum sulfate. This is preferably accomplished in a rotary kiln. Ferric sulfate will begin to desulfatize at a fairly low temperature and the desulfatization is complete at under 500° C., whereas the aluminum sulfate does not commence desulfatization until about 590° C., and the potassium sulfate is unaffected until a very much higher temperature is reached, say about 2000° C. The heat zone in the kiln is therefore graduated to a temperature of not over 500° C. The $SO_3$ gas is thus all driven off from the ferric sulfate, the result being a mass of calcined material containing the ferric oxide of the mineral which is insoluble in water and the sulfates of aluminum and potassium, both of which are soluble in water.

This mass I now leach in water preferably hot and with wet grinding in a ball mill. The sulfates dissolve while the ferric oxide does not, wherefore an extremely efficient separation is effected and the ferric oxide is ground fine enough to be used as paint oxide. When the water leach is concentrated to the proper extent the potassium and aluminum sulfates will come out as potash alum. If desirable I can separate the bulk of the potassium sulfate from the iron and aluminum sulfates by keeping the sludge with its admixed sulfuric acid hot until I decant or filter off the hot acid.

After calcination the ferric oxide, mixed with small proportions of such other oxides as may have been ingredients of the mineral treated, is a valuable product for use in the manufacture of iron and steel, or if desired, it can be used for making paint oxide. The water solution of sulfates may be concentrated either to the point of getting the potash-alum with its water of crystallization ($24H_2O$) or to dryness. The latter will be more efficient in securing the whole amount of these salts, but where potash-alum is desired as a product, the crystallization method must be employed to get the same. The remaining mother liquor can either be boiled down or returned to a subsequent leach, in order to get the last remaining traces of the pay salts.

If it be desired to obtain potassium sulfate separately the concentrated acid being kept hot can be decanted from the sludge and returned to the next leaching operation, thus picking up an additional supply of potassium sulfate. When the acid has thus absorbed all of the potassium sulfate that it can advantageously carry, it can be allowed to get cold, when the potassium sulfate will precipitate out, or as an alternative it can be passed thru a zone of heat sufficiently high to drive off the excess acid and thus leave the bulk of its sulfate of potassium.

I have found that by the method of my invention the time needed for extraction is shortened, the efficiency is increased, and the amount of fuel is reduced as compared with prior processes.

Having thus described my invention, what I claim and desire to secure by Letters Patent is:

1. The process of treating minerals containing potassium, aluminum and iron which consists in bringing these ingredients into solution as sulfates, the solution containing free sulphuric acid, concentrating the solution by removal of water thereby causing the ferric and aluminum sulfates to precipitate, and cooling off the mixture thus precipitating the potassium sulfate, and calcining the three mixed sulfates at such temperatures as will decompose the ferric sulfate without decomposing the potassium and aluminum sulfates.

2. The process of extracting potassium, aluminum, and iron values from siliceous minerals which includes treating with sulfuric acid to bring the said ingredients into solution as sulfates, separating the insoluble residue, then precipitating substantially all of the ferric and aluminum sulfates while leaving the potassium sulfate in solution by concentrating the excess acid in the solution.

In testimony whereof, I have signed my name to this specification.

CHARLES E. ARNOLD.